United States Patent [19]
Birch et al.

[11] Patent Number: 5,606,853
[45] Date of Patent: Mar. 4, 1997

[54] GASEOUS FUEL COMPRESSION AND CONTROL SYSTEM FOR GAS TURBINE ENGINE

[75] Inventors: Peter H. Birch, Horsham; Mark G. Norton, Hove, both of United Kingdom

[73] Assignee: Aisin Seiki Kabushiki Kaisha, Kariya, Japan

[21] Appl. No.: 430,386

[22] Filed: Apr. 28, 1995

[30] Foreign Application Priority Data

Apr. 30, 1994 [GB] United Kingdom ............... 9408677

[51] Int. Cl.⁶ .................................. F02C 9/30
[52] U.S. Cl. .................. 60/39.281; 60/39.465; 417/45
[58] Field of Search ............... 60/39.281, 39.45, 60/39.465, 734; 417/41.1, 45, 410.4

[56] References Cited

U.S. PATENT DOCUMENTS

| 3,693,601 | 9/1972 | Sauder | 60/39.45 |
| 4,815,278 | 3/1989 | White. | |
| 4,922,710 | 5/1990 | Rowen et al. | 60/39.465 |
| 4,971,522 | 11/1990 | Butlin | 417/45 |
| 5,103,629 | 4/1992 | Mumford et al.. | |

FOREIGN PATENT DOCUMENTS 0474585  3/1992  European Pat. Off. .

*Primary Examiner*—Louis J. Casaregola
*Attorney, Agent, or Firm*—Sughrue, Mion, Zinn, Macpeak & Seas

[57] ABSTRACT

A gaseous fuel compression and control system for gas turbine engine (30) comprises a screw compressor (10) driven by an electric motor (11) for feeding gaseous fuel to the gas turbine engine, and a modulating device (12) for modulating the rotational speed of the motor by controlling the frequency of electric power to the motor in response to sensed output power of the gas turbine engine.

7 Claims, 7 Drawing Sheets

GASEOUS FUEL COMPRESSION AND CONTROL SYSTEM FOR GAS TURBINE ENGINE

BACKGROUND OF THE INVENTION

1. Field of the Invention

This invention relates to a gaseous fuel compression and control system for gas turbine engine.

2. Description of the Prior Art

A conventional gaseous fuel compression and control system for gas turbine engine is disclosed in, for example, U.S. Pat. No. 4,536,126 or U.S. Pat. No. 5,103,629. This conventional gaseous fuel control system includes a source of compressed gaseous fuel and many control valves which are interposed between the source of compressed gaseous fuel and a combustion chamber of a gas turbine and which control gas fuel flow to the combustion chamber in response to computer-generated control signals (for starting, for controlling engine speed and output power and so on). In general, the source of compressed gaseous fuel has always included a compressor of the reciprocating type. These traditionally specialised compressors are employed for duties which require the raising of the pressure of a flammable gas such as natural gas for combustion in the gas turbine.

Reciprocating compressors normally operate at fixed speed and displacement. Therefore, in order to regulate fuel flow to a gas turbine to control the gas turbine output power and speed, a complex control system using the above mentioned control valves is required. Furthermore, a high pressure accumulator which is maintained between high and low pressure limits is also needed for controlling the fuel flow.

There are many mechanical connections in the construction of a reciprocating compressor. There are also many connections in the inlet and outlet pipework and associated components of the above control systems. The integrity of these connections is threatened by the intense vibrations associated with reciprocating compressors. Therefore, the possibility of gas leaks occurring is relatively high.

SUMMARY OF THE INVENTION

It is an object of the present invention to provide an improved gaseous fuel compression and control system for a gas turbine engine which overcomes the above drawback.

It is another object of the present invention to provide an improved gaseous fuel compression and control system for a gas turbine engine which can simplify the control of fuel flow to a gas turbine and which can improve the safety of the system.

In order to achieve these objects, there is provided a gaseous fuel compression control system for a gas turbine engine comprising:

a screw compressor driven by an electric motor for compressing gaseous fuel for supply to the gas turbine engine, a power sensor for sensing the output power of the gas turbine engine, and modulating means for controlling the frequency of electrical power supplied to the electric motor, so as to control speed of the motor, in response to a control signal derived directly or indirectly from the power sensor.

DESCRIPTION OF THE PREFERRED EMBODIMENTS

A gaseous fuel compression and control system for a gas turbine engine in accordance with preferred embodiments of the present invention will be described with reference to the attached drawings.

Figure 1:
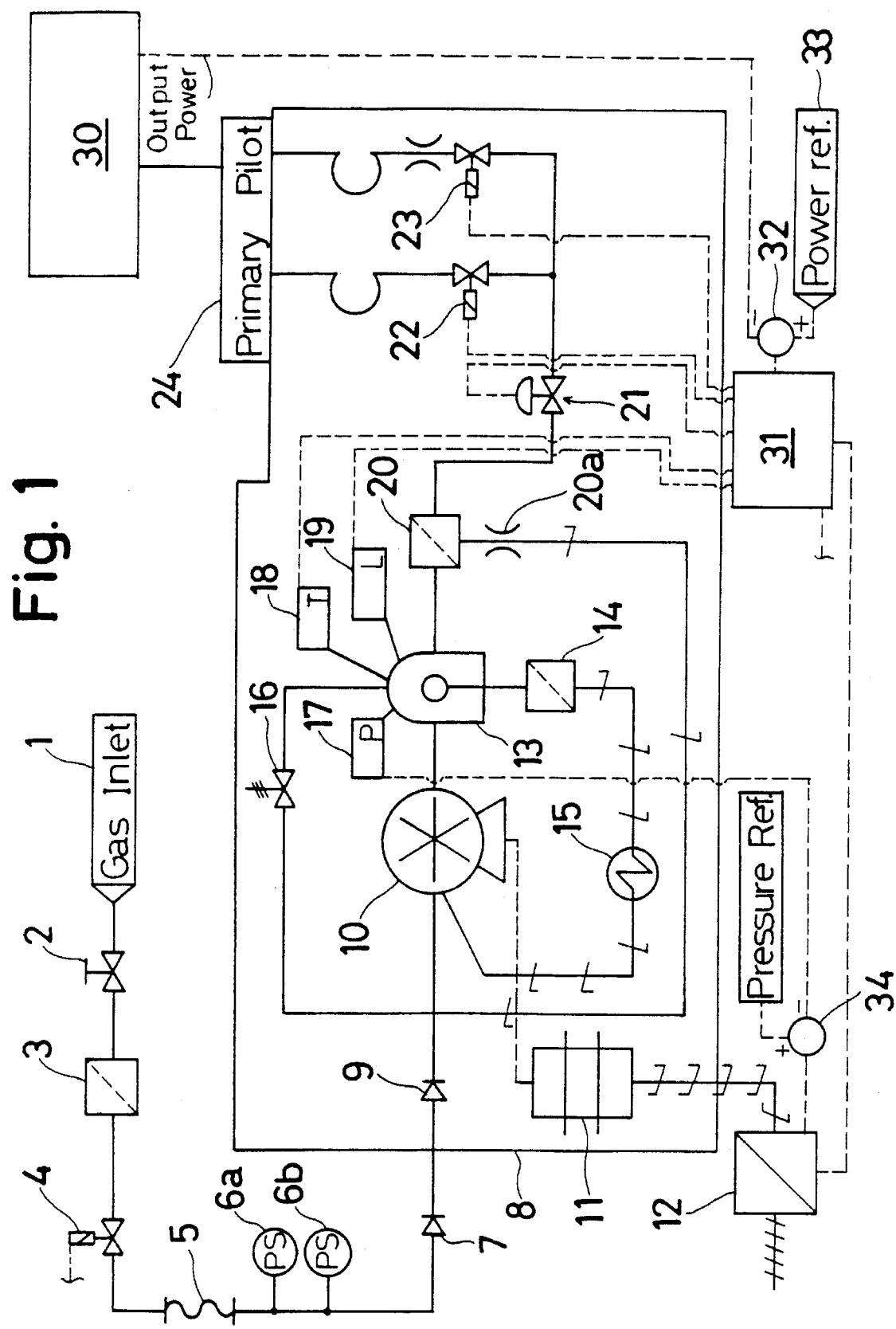
FIG. 1 is a schematic view of a first embodiment of a gaseous fuel compression and control system supplying a gas turbine engine in accordance with the present invention.

Referring first to FIG. 1, hydrocarbon gas, usually natural gas at low pressure, enters the system from a mains supply 1. Items 2 to 7 are required by British Gas in this embodiment and protect the mains supply from being under- or over-pressurized by a fault developing in the compressor system. The gas passes through a plug cock 2, a particulate filter 3, a solenoid isolating valve 4, a flexible connection 5, under and over pressure electronic sensors 6a and 6b and through an approved non-return valve 7.

The inlet pipe passes through the wall of a compartment 8 where the gas passes through a check valve 9 and into the inlet of a compressor 10. The compressor 10 is a Lyscholm oil flooded screw type compressor which is driven by an electric motor 11 and an inverter device 12. The Lyscholm compressor 10 consists of two shafts or rotors (not shown) designated a female and male which interact like a long pitch multiple start thread squeezing the entrapped oil and gas axially from inlet to discharge. There is a near linear relationship between shaft speed and flow for discharge pressures within the normal operating range. The oil flood performs two basic tasks which are to lubricate and seal the rotors in the housing (not shown) and to absorb the heat of compression, making the compression polytropic and more efficient than an equivalent adiabatic process. A low discharge temperature for any given pressure ratio is thus realised and combined with the continuous presence of oil, corrosion is not a problem. Maintenance may indeed be zero even for an operating life in excess of 10 years.

The outlet of the compressor 10 is connected to a separator tank 13 which separates oil from the oil and gas mixture and which helps to snub any small pressure pulsations in the discharge. The separator tank 13 is connected to the inlet of the compressor 10 through a filter 14 and a cooler 15 so that the separated oil is recirculated to the compressor 10. Furthermore, the separator tank 13 is connected to the pipe between the inlet of the compressor 10 and the check valve 9 through a relief valve 16. In this embodiment, when the pressure in the separator tank 13 becomes more than a predetermined pressure, the relief valve 16 is pneumatically opened and the gas is released to the inlet pipe and not to atmosphere. In the separator tank 13, there are provided a level switch 19 for monitoring the oil level, a pressure sensor 17 for monitoring the discharge (gas) pressure and a thermocouple 18 for monitoring the discharge (gas) temperature. If an oil leak occurs and the lower oil level is detected by the level switch 19, or if the increase of the discharge (gas) temperature is detected by the thermocouple 18, these error signals are sent to a controller 31 which shuts down the system, thereby preventing the escape of gas.

The separator tank 13 is connected to a coalescing filter 20 which removes small droplets of oil contained in the high pressure gas. The coalescing filter 20 is connected to the pipe between the inlet of the compressor 10 and the check valve 9 through a bleed hole 20a so as to recirculate the small amount of coalesced oil to the inlet of the compressor 10.

In this embodiment, the coalescing filter 20 is connected to a control valve 21 and the control valve 21 is connected to the pilot and primary burners of a combustion chamber 24 of a gas turbine engine 30 through cut-off valves 22 and 23. The control valve 21 is a proportional flow control valve and is controlled by a control signal of the controller 31 in response to an output signal of a comparator 32. The comparator 32 compares output power of the gas turbine engine 30 with a power reference 33 and sends the output signal to the controller 31.

Figure 2:
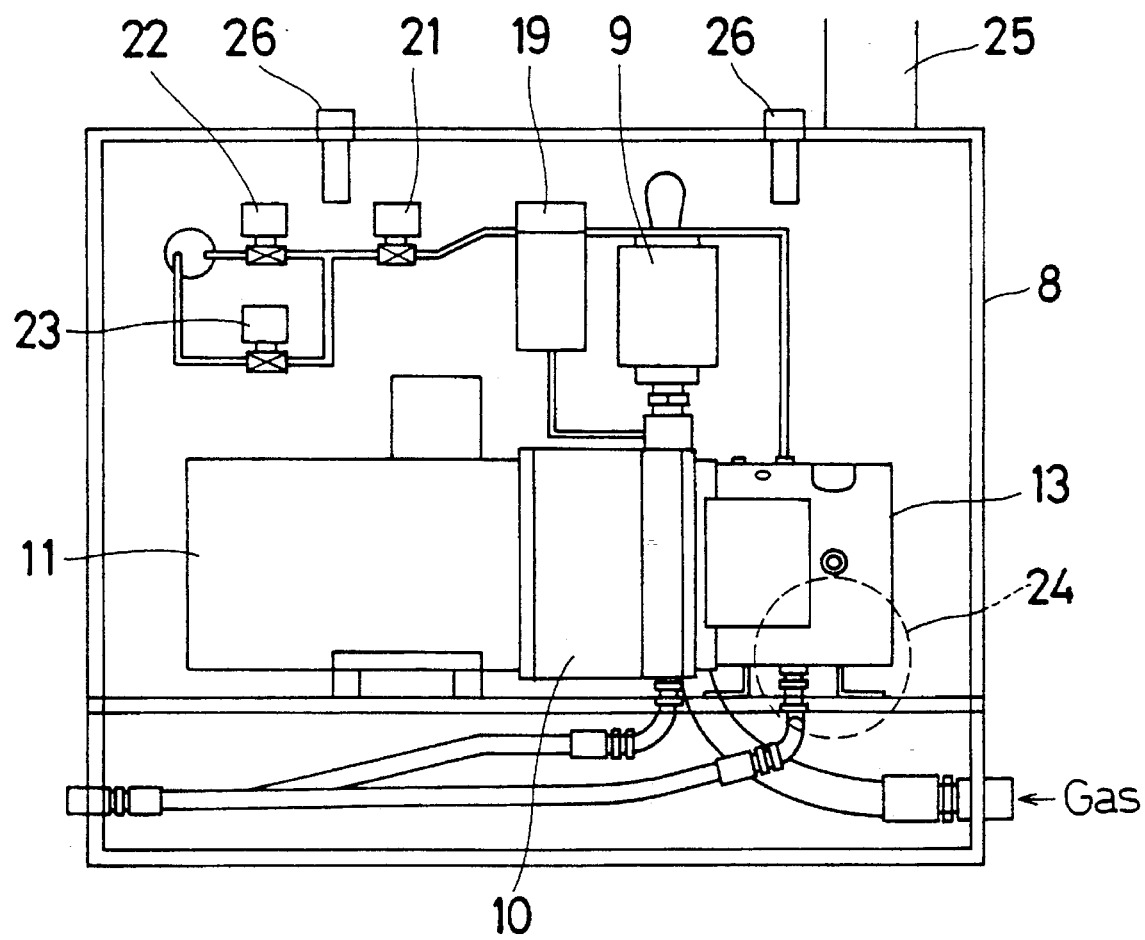
FIG. 2 is an elevational view of the first embodiment shown in FIG. 1.
Figure 3:
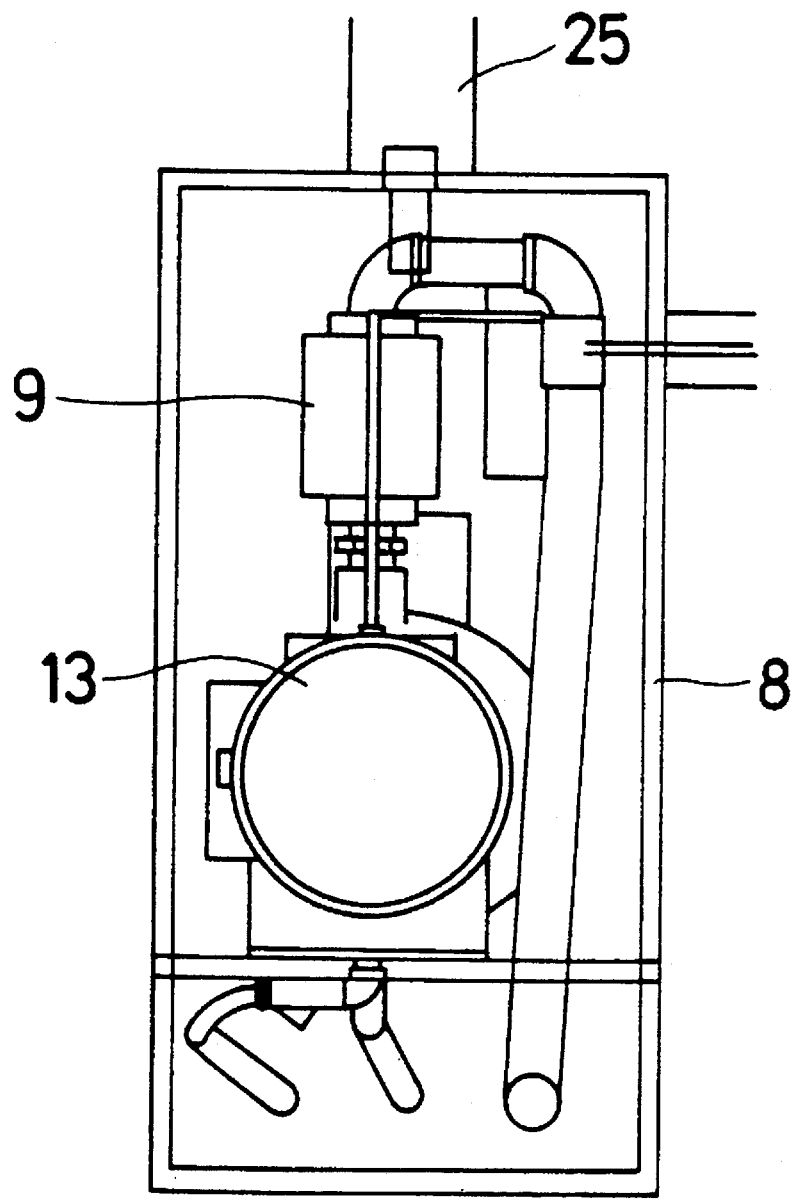
FIG. 3 is a side view of the first embodiment shown in FIG. 1.
Figure 4:
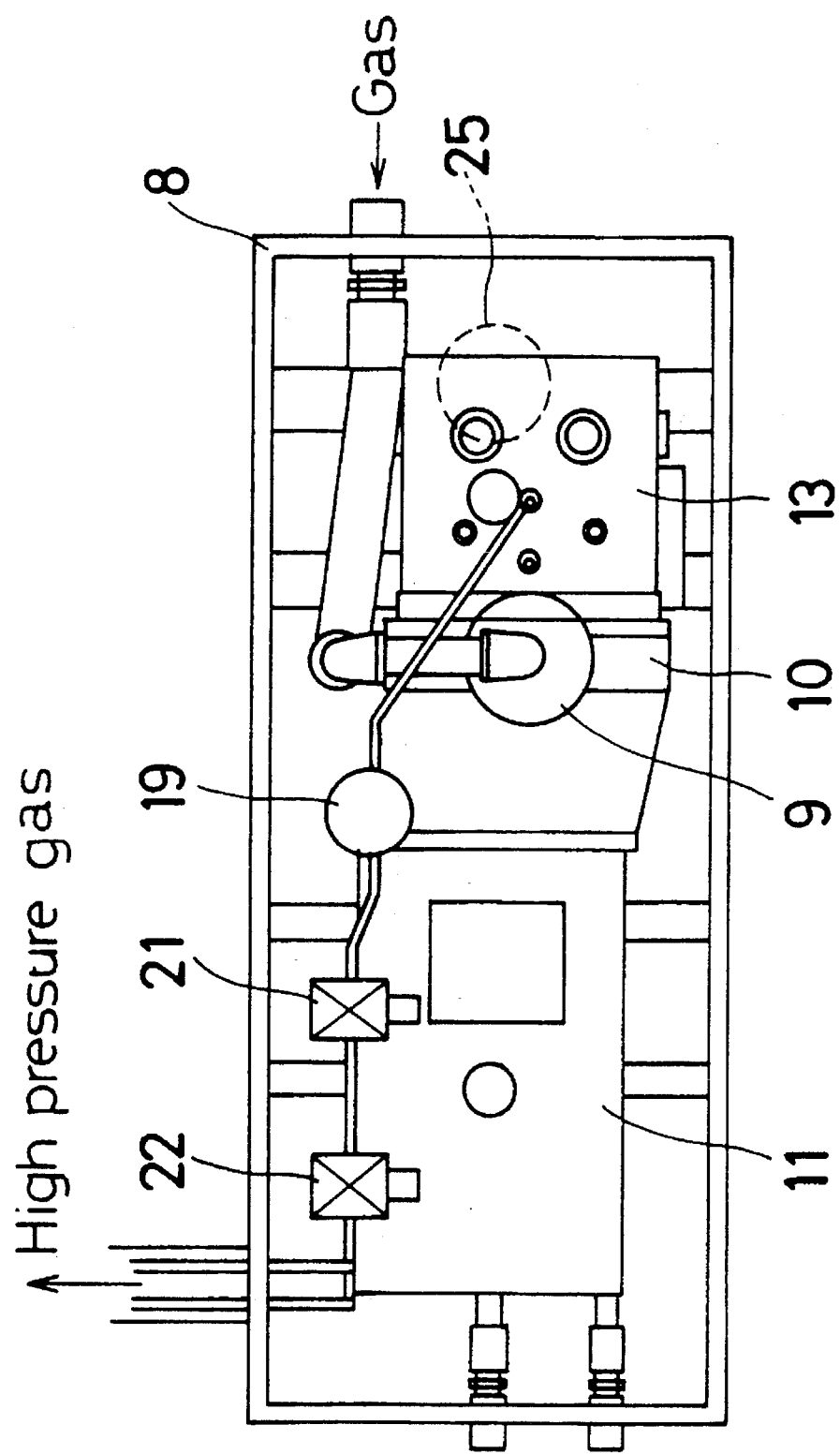
FIG. 4 is a top view of the first embodiment shown in FIG. 1.

Referring next to FIGS. 2 to 4, the gaseous fuel control system is completely contained within the enclosed compartment 8. A ventilation fan (not shown) is connected and sealed to an opening 24 and air is circulated by the fan into the compartment 8 and exits through a second port 25. As the ventilation air circulates in the compartment some of it passes over gas detectors 26.

Figure 5:
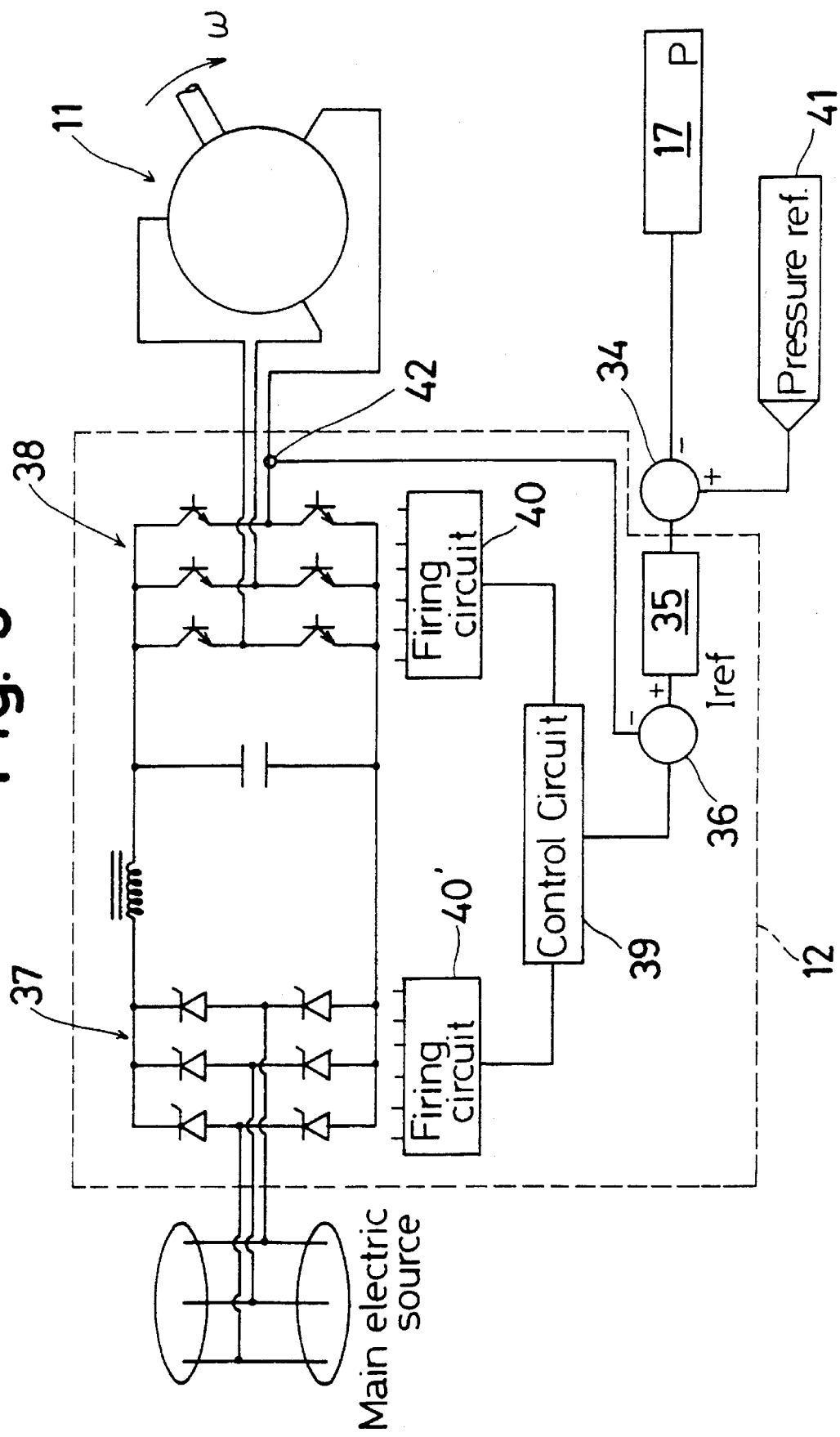
FIG. 5 is a schematic view of a modulating means of a first embodiment.

As shown in FIG. 5, the inverter device 12 is interposed between the electric induction motor 11 and the main electric source and includes a converter (rectifier or controlled rectifier) 37 which transforms AC into DC, an inverter 38 which transforms DC into AC, a compensator 35, such as a proportional, integral and derivative (PID) device, a second comparator 36, a power transducer 42, a control circuit 39 and a firing circuit 40. The current pressure signal of the pressure sensor 17 is compared in a first comparator 34 with a pressure reference 41, and an output signal of the first comparator 34 is sent to the compensator 35. In response to that output signal, the compensator 35. In response to that output signal the compensator 35 sends a compensating signal Iref to the second comparator 36. The compensating signal Iref is a current signal for obtaining a fuel pressure the same as the pressure reference 41.

The compensating signal Iref is compared in the second comparator 36 with a current signal which is sent from the power transducer 42. The power transducer 42 may be disposed between the converter 37 and the inverter 38 or between the inverter 38 and the motor 11 (as illustrated) or between the mains electric source and the converter 37 and measures the current which is fed to the inverter 38. An output signal of the second comparator 36 is sent to the control circuit 39. The control circuit 39, which may be analogue or digital, determines what effective voltage and frequency must be synthesized by the inverter 38 in order to supply current to the motor 11 commensurate with present demand for speed and torque. The control circuit 39 determines the firing sequences necessary for the inverter 38 and sends these signals which may be TTL to the firing circuits 40 and 40'. The firing circuit 40' is designed to accept the control signals for the converter 37 which may be thyristors or any other type of appropriate semiconductor switching device. Electrical power from the mains electric source is thus inverted at d.c. voltage. The firing circuit 40 is designed to accept the control signals from the control circuits 39 and output the correct gate signals for the inverter 38 which may be transistors, mosfets, IGBTs or any other type of appropriate semiconductor switching device. Electrical power from the d.c. link is thus inverted at an appropriate voltage and a.c. frequency and can therefore modulate the motor speed as desired.

The above-described embodiment of the gaseous fuel control system for gas turbine engine operates as follows. Referring to FIG. 1, on starting up the gas turbine engine 30, the gas fuel control system operates firstly to produce the required fuel pressure to enable gas at an elevated pressure to enter the combustor for ignition, as follows. A pressure reference signal 41, which may be from an operator or from the gas turbine controller 31, is sent to the first comparator 34, the output of which is fed to the inverter device 12 to start up the motor 11 which drives the compressor 10 and immediately produces pressure in the separator tank 13 because the control valve 21 and the cut-off valves 22 and 23 are initially closed. The plug cock 2 and the solenoid isolating valve 4 are of course assumed to be opened for normal operation. When the correct pressure is generated in the separator tank 13, the gas turbine start sequence can be started. If a pilot is used, the valve 23 will be opened by the controller 31. When this small flow flows, the gas compressor 10 must speed up a little to supply this small flow. When the pilot is lit, the primary valve 22 can be opened by the controller 31. The control valve 21 can be opened slowly thus gradually allowing more flow to gas turbine to accelerate it.

In a modification of the above described embodiment, the control valve 21 can be omitted so that the speed of the motor 11 alone controls the supply of compressed hydrocarbon gas through the cut-off valves 22 and 23 to the gas turbine. If there is no control valve, the block valves can be opened before the gas compressor is energised. To start the engine the gas compressor can be accelerated under controlled conditions from the (gas turbine) controller 31.

Alternatively the start sequence can be any that the owner, operator or manufacturer of the system wishes to employ.

After the gas turbine 30 is started, the gas fuel control system operates continuously in pressure feedback mode. The (gas turbine) controller 31 of the embodiment of FIGS. 1 to 5 generates two signals in response to output power. One is the required gas flow rate and therefore positions the control valve accordingly and the other is the required gas pressure which therefore is the gas compression system set point pressure.

When the present output power is higher than the power reference 33, it becomes necessary to reduce the gas fuel flow to the engine 30. The controller 31 sends a signal to the control valve 21 which begins to close. A natural and temporary result of this is that the gas pressure rises slightly. The compressor 10 is therefore slowed down by the inverter device 12 until a new equilibrium is achieved.

When the present output power is lower than the power reference 33, it becomes necessary to increase the gas fuel flow rate to the engine 30. The controller 31 sends a signal to the control valve 21 which begins to open. A natural and temporary result is that the gas pressure falls slightly. The compressor 10 is therefore accelerated by the inverter device 12 until a new equilibrium is reached.

Figure 6:
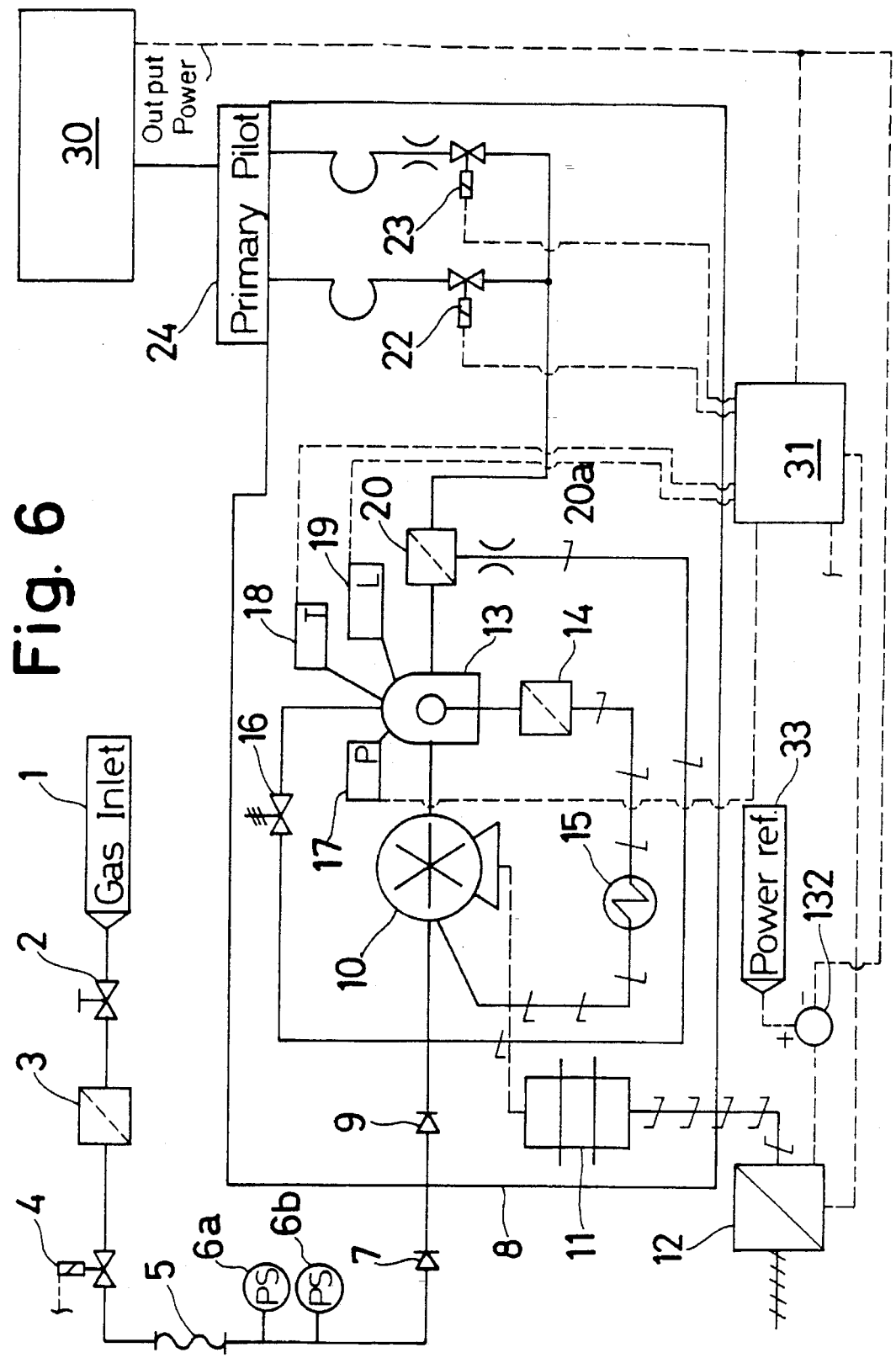
FIG. 6 is a schematic view of a second embodiment of a gaseous fuel compression and control system supplying a gas turbine engine in accordance with the present invention.
Figure 7:
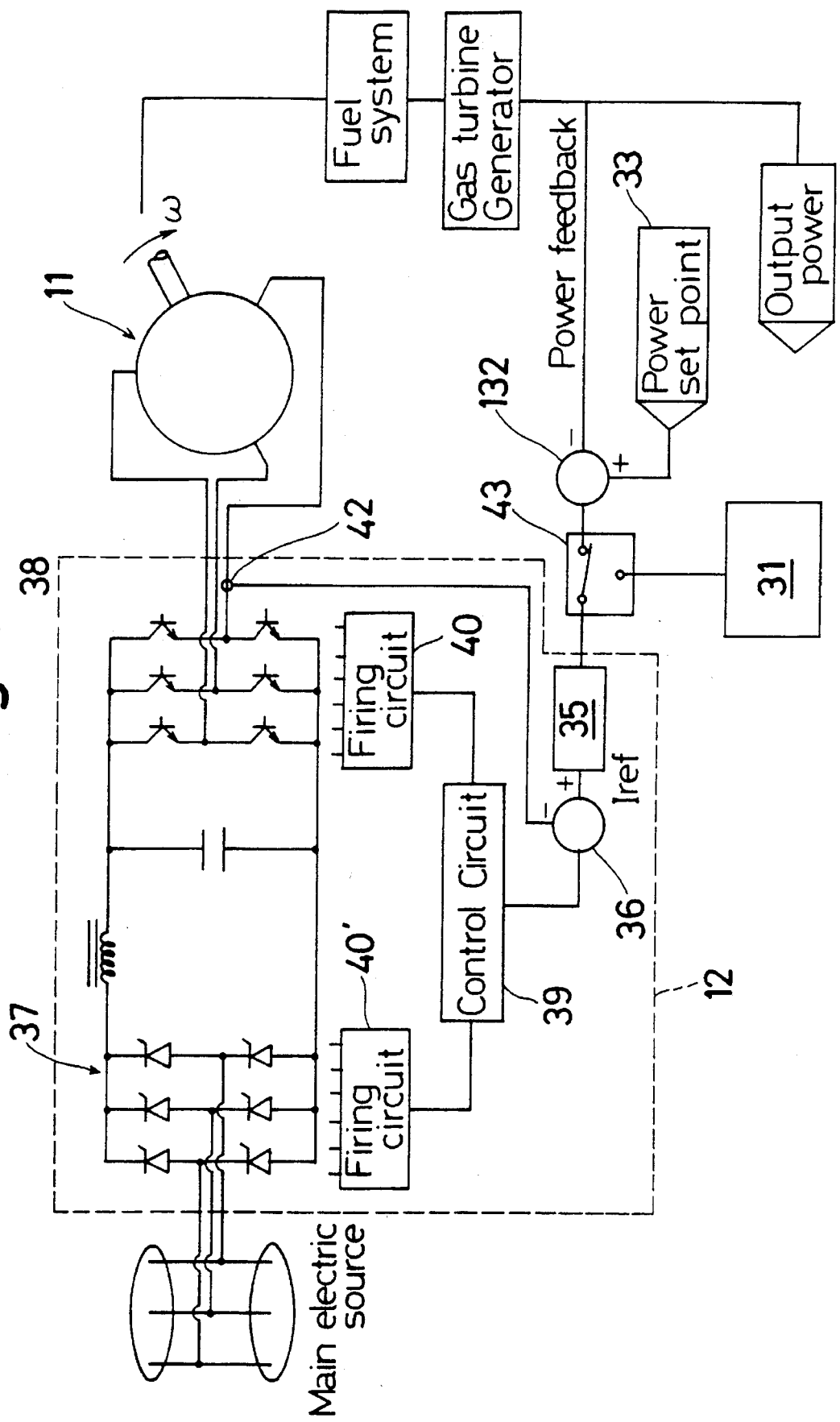
FIG. 7 is a schematic view of a modulating means of a second embodiment.

FIG. 6 and FIG. 7 show a second embodiment of the invention in which the proportional control valve 21 of the first embodiment is eliminated. In FIGS. 6 and 7, the same parts as those of FIGS. 1 to 5 are identified by the same reference numerals. Referring to FIGS. 6 and 7, the speed of the motor 11 is controlled by the inverter device 12 directly in response to the output power of the gas turbine engine 30. The comparators 32 and 34 of the first embodiment are replaced in this second embodiment by a single comparator 32 which receives an input and feedback signal representing output power and the power reference signal 33. This embodiment operates as follows. The controller 31 sends its requirement for gas fuel flow directly to the inverter 12 of the gas compressor 10 through a changeover switch 43. When gas flow is requested, the valves 4, 22 and 23 are opened. The compressor 10 is then started at low speed until the pilot is lit. When appropriate the primary valve 23 can be opened and lit by the pilot. To accelerate the gas turbine engine 30, the controller requires more gas flow by accelerating a pilot, primary and main burners whilst other systems may only have a main burner. When the gas turbine engine 30 starts to produce power, the start sequence can end and on actuation of the changeover switch 43 the engine 30 becomes controlled by the power feed back loop. If power is lower than the set point 33, the error signal produced tends to accelerate the gas compressor 30 whilst if the output power is higher than the set point 33 the error signal produced tends to slow down the compressor 10. Thus the engine output power is modulated by the compressor speed. Since the other structures are the same as the first embodiment, the description is omitted.

As mentioned above, according to the present invention, since the fuel compressor speed is modulated by the motor inverter, compressed gas is supplied virtually on demand within the time it takes to accelerate the compressor shaft. There is no long term storage of dangerous compressed gas. Because the motor and inverter can be utilised as main control elements the control valve can be eliminated. By this method it is able to simplify the control of fuel flow to a gas turbine. Furthermore, since the connections are a few and the integrity of these connections is not threatened by any intense vibrations, it is able to improve the safety of the system.

We claim:

1. A gaseous fuel compression and control system for a gas turbine engine comprising:

a screw compressor driven by an electric motor for compressing gaseous fuel for supply to the gas turbine engine;

a power sensor for sensing the output power of the gas turbine engine; and modulating means for controlling the frequency of electrical power supplied to the electric motor, so as to control the speed of the electric motor, in response to a control signal derived from the power sensor.

2. A gaseous fuel compression and control system according to claim 1, wherein the power sensor is associated with a comparison means for comparing the output of the power sensor, representing the instantaneous output power of the gas turbine engine, with a reference power value to derive the control signal for varying the motor speed in a manner to vary the output power of the gas turbine engine until it coincides with the reference power value.

3. A gaseous fuel compression and control system according to claim 1, further comprising a separator tank fed by the compressor for removing oil entrained in the compressed gaseous fuel.

4. A gaseous fuel compression and control system according to claim 3, further comprising a control valve in a fuel supply line for delivering gaseous compressed fuel from the compressor to the engine, and pressure sensing means for monitoring the pressure in the separator tank, wherein the control signal is effective to vary the setting of the control valve, thereby to alter the delivery rate of fuel from the compressor to the engine and thus the monitored pressure in the separator tank; and a secondary control signal generated from a comparison between the monitored pressure in the separator tank and a reference pressure is effective to control the frequency of electrical power supplied by the modulating means to the electric motor, thereby to control the speed of the motor.

5. A gaseous fuel compression and control system according to claim 4, wherein the control valve is a proportional flow control valve.

6. A gaseous fuel compression and control system according to claim 3, further comprising means for monitoring the oil level and the gas temperature in the separator tank and for shutting down the system if too low an oil level or too high a gas temperature is sensed.

7. A gaseous fuel compression and control system according to claim 1, wherein the modulating means controls both the voltage and the frequency of electrical power supplied to the electric motor.

* * * * *